US012700660B2

(12) United States Patent
Lou et al.

(10) Patent No.: US 12,700,660 B2
(45) Date of Patent: Aug. 4, 2026

(54) WIRELESS COMMUNICATION DEVICE AND WIRELESS COMMUNICATION SYSTEM

(71) Applicant: QuantumZ Inc., Kaohsiung City (TW)

(72) Inventors: Chih Yang Lou, Kaohsiung City (TW); Meng-Hua Tsai, Kaohsiung City (TW); Sin-Siang Wang, Kaohsiung City (TW); Wei Ting Lee, Kaohsiung City (TW)

(73) Assignee: QuantumZ Inc., Kaohsiung City (TW)

( * ) Notice: Subject to any disclaimer, the term of this patent is extended or adjusted under 35 U.S.C. 154(b) by 58 days.

(21) Appl. No.: 18/929,645

(22) Filed: Oct. 29, 2024

(65) Prior Publication Data

US 2025/0210851 A1 Jun. 26, 2025

(30) Foreign Application Priority Data

Dec. 25, 2023 (TW) ................................ 112150633

(51) Int. Cl.
*H01Q 1/22* (2006.01)
*H01Q 1/24* (2006.01)
*H01Q 13/10* (2006.01)

(52) U.S. Cl.
CPC ............. *H01Q 1/2266* (2013.01); *H01Q 1/24* (2013.01); *H01Q 13/10* (2013.01)

(58) Field of Classification Search
CPC ........ H01Q 1/2266; H01Q 1/24; H01Q 13/10; H01Q 1/243; H01Q 1/38
See application file for complete search history.

(56) References Cited

U.S. PATENT DOCUMENTS

| | | | | |
|---|---|---|---|---|
| 2014/0168012 | A1* | 6/2014 | Mankowski ............. | H01Q 3/04 342/359 |
| 2016/0344224 | A1* | 11/2016 | Hong ........................ | H02J 7/70 |
| 2019/0288371 | A1* | 9/2019 | Kamgaing ........... | H01Q 1/2283 |
| 2020/0021010 | A1* | 1/2020 | Ou ....................... | H01Q 21/065 |
| 2020/0153116 | A1* | 5/2020 | Onaka .................. | H01Q 21/065 |

* cited by examiner

*Primary Examiner* — Dieu Hien T Duong
(74) *Attorney, Agent, or Firm* — CKC & Partners Co., LLC

(57) ABSTRACT

A wireless communication device includes an antenna module and a flexible substrate. The antenna module includes an antenna structure and a control chip. The control chip is configured to use an antenna structure to perform wireless communication. The flexible substrate is used to carry the antenna module and includes two substrate regions. The antenna structure includes a first antenna radiation plate and a second antenna radiation plate. An open slot is extended from an edge of the first antenna radiation plate to a center of the first antenna radiation plate. The second antenna radiation plate is disposed under the first antenna radiation plate to overlap the first antenna radiation plate. There is a distance between the first antenna radiation plate and the second antenna radiation plate, thus the second antenna radiation plate is coupled to the first antenna radiation plate.

18 Claims, 9 Drawing Sheets

1st inner layer

Top layer

2nd inner layer

3rd inner layer

Bottom layer

WIRELESS COMMUNICATION DEVICE AND WIRELESS COMMUNICATION SYSTEM

CROSS-REFERENCE TO RELATED APPLICATION

This application claims priority to Taiwan Application Serial Number 112150633, filed Dec. 25, 2023, which is herein incorporated by reference in its entirety.

BACKGROUND

Field of Invention

The present invention relates to a wireless communication device and a wireless communication system.

Description of Related Art

With the rapid advancement of technology in recent years, electronic products such as PCs, tablet PCs, NBs, and smartphones have become indispensable in our daily lives. In order to provide various functions to meet users' demands, electric components used in electronic products are fabricated in various configurations. For example, electric components are foldable to reduce sizes of electronic products for easy carrying the electronic products.

However, because the inner space of a mobile electronic product is greatly limited, providing high speed data transmission for the mobile electronic product become challenging.

SUMMARY

Embodiments of the present invention provide a wireless communication device and a wireless communication system. The wireless communication device and the wireless communication system are adapted for various mobile electronic products, and capable of enabling the mobile electronic products to transmit date at a higher speed.

In accordance with embodiments of the present invention, the wireless communication device includes a radio frequency circuit module. The radio frequency circuit module includes an antenna module and at least one flexible substrate. The antenna module includes an antenna structure and a control chip. The control chip is electrically connected to the antenna structure and configured to use the antenna structure to perform wireless communication. The flexible substrate is configured to carry the antenna module. The at least one flexible substrate includes two substrate regions, one of the substrate regions encompasses the antenna structure or the control chip, a foldable portion of the at least one flexible substrate is foldable at a junction line between the substrate regions, and the radio frequency circuit module is foldable at the foldable portion. The antenna structure includes a first antenna radiation plate and a second antenna radiation plate. The first antenna radiation plate has a plurality of open slots extending from a plurality of edges of the first antenna radiation plate to a center of the first antenna radiation plate. The second antenna radiation plate is disposed under the first antenna radiation plate and overlapped with the first antenna radiation plate along a normal direction of the first antenna radiation plate. There is a distance between the first antenna radiation plate and the second antenna radiation plate, and the distance allows the second antenna radiation plate to couple with the first antenna radiation plate.

In some embodiments, the radio frequency circuit module may be bent in an L-shape, and disposed at a corner of the wireless communication device.

In some embodiments, the second antenna radiation plate of the antenna structure further includes at least one first feeding portion and at least one second feeding portion. The least one first feeding portion is electrically connected to a transmission (TX) pin of the control chip, and the at least one second feeding portion is electrically connected to a receiving (RX) pin of the control chip.

In some embodiments, the length of each of the open slots is ranging from 0.015λ to 0.1λ, the width of each of the open slots is ranging from 0.015λ to 0.1λ, where λ is the wavelength of the wireless communication device.

In some embodiments, the distance between the first antenna radiation plate and the second antenna radiation plate is ranging from 0.015λ to 0.1λ, where λ is the wavelength of the wireless communication device.

In some embodiments, the wireless communication device further includes a storage device. The storage device stores a plurality of first data sets and electrically connected to the radio frequency circuit module to use the radio frequency circuit module to transmit the first data sets, or to receive a plurality of second data sets and store the second data sets into the storage device.

In some embodiments, the wireless communication device further includes a battery and a wireless charging device. The battery is configured to provide electric power to the radio frequency circuit module and the storage device. The wireless charging device is configured to charge the battery.

In some embodiments, material of the at least one flexible substrate is liquid crystal polymer (LCP).

In some embodiments, the antenna module further includes a metal plate disposed on the antenna module and overlapped with the antenna structure. The metal plate has a though hole to expose the antenna structure, an edge of the metal plate has a corner portion, and an angle included by two side of the corner portion is in a range from 100 degrees to 150 degrees.

In some embodiments, the wireless communication device further includes a magnetic device. An iron structure or a magnetic structure of a corresponding wireless communication device and the magnetic device are attracted by each other for positioning.

In accordance with embodiments of the present invention, the wireless communication system includes a plurality of wireless communication devices. Each of the wireless communication devices includes a radio frequency circuit module. The radio frequency circuit module includes an antenna module and at least one flexible substrate. The antenna module includes an antenna structure and a control chip. The control chip is electrically connected to the antenna structure and configured to use the antenna structure to perform wireless communication. The flexible substrate is configured to carry the antenna module. The at least one flexible substrate includes two substrate regions, one of the substrate regions encompasses the antenna structure or the control chip, a foldable portion of the at least one flexible substrate is foldable at a junction line between the substrate regions, and the radio frequency circuit module is foldable at the foldable portion. The antenna structure includes a first antenna radiation plate and a second antenna radiation plate. The first antenna radiation plate has a plurality of open slots extending from a plurality of edges of the first antenna radiation plate to a center of the first antenna radiation plate. The second antenna radiation plate is disposed under the first antenna radiation plate and overlapped with the first antenna radiation plate along the normal direction of the first antenna radiation plate. There is a distance between the first antenna radiation plate and the second antenna radiation plate, and the distance enables the second antenna radiation plate to couple with the first antenna radiation plate. When a first one of the wireless communication devices communicates with a second one of the wireless communication devices, the antenna module of the first one of the wireless communication devices and the antenna module of the second one of the wireless communication devices are arranged to face each other.

In some embodiments, the radio frequency circuit module may be bent in an L-shape, and disposed at a corner of the wireless communication device.

In some embodiments, the second antenna radiation plate of the antenna structure further includes: at least one first feeding portion and at least one second feeding portion. The least one first feeding portion is electrically connected to a transmission (TX) pin of the control chip, and the at least one second feeding portion is electrically connected to a receiving (RX) pin of the control chip.

In some embodiments, the length of each of the open slots is ranging from 0.015λ to 0.1λ, the width of each of the open slots is ranging from 0.015λ to 0.1λ, where λ is the wavelength of the wireless communication device.

In some embodiments, the distance between the first antenna radiation plate and the second antenna radiation plate is ranging from 0.015λ to 0.1λ, where λ is a wavelength of the wireless communication device.

In some embodiments, each of the wireless communication devices further includes a storage device. The storage device stores a plurality of first data sets and electrically connected to the radio frequency circuit module to use the radio frequency circuit module to transmit the first data sets, or to receive a plurality of second data sets and store the second data sets into the storage device.

In some embodiments, each of the wireless communication devices further includes a battery and a wireless charging device. The battery is configured to provide electric power to the radio frequency circuit module and the storage device. The wireless charging device is configured to charge the battery.

In some embodiments, material of the at least one flexible substrate is liquid crystal polymer (LCP).

In some embodiments, the antenna module further includes a metal plate disposed on the antenna module and overlapped with the antenna structure. The metal plate has a though hole to expose the antenna structure, an edge of the metal plate has a corner portion, and an angle included by two side of the corner portion is in a range from 100 degrees to 150 degrees.

In some embodiments, each of the wireless communication devices further includes a magnetic device. An iron structure or a magnetic structure of a corresponding wireless communication device and the magnetic device are attracted by each other for positioning.

BRIEF DESCRIPTION OF THE DRAWINGS

The invention can be more fully understood by reading the following detailed description of the embodiment, with reference made to the accompanying drawings as follows.

Figure 1:
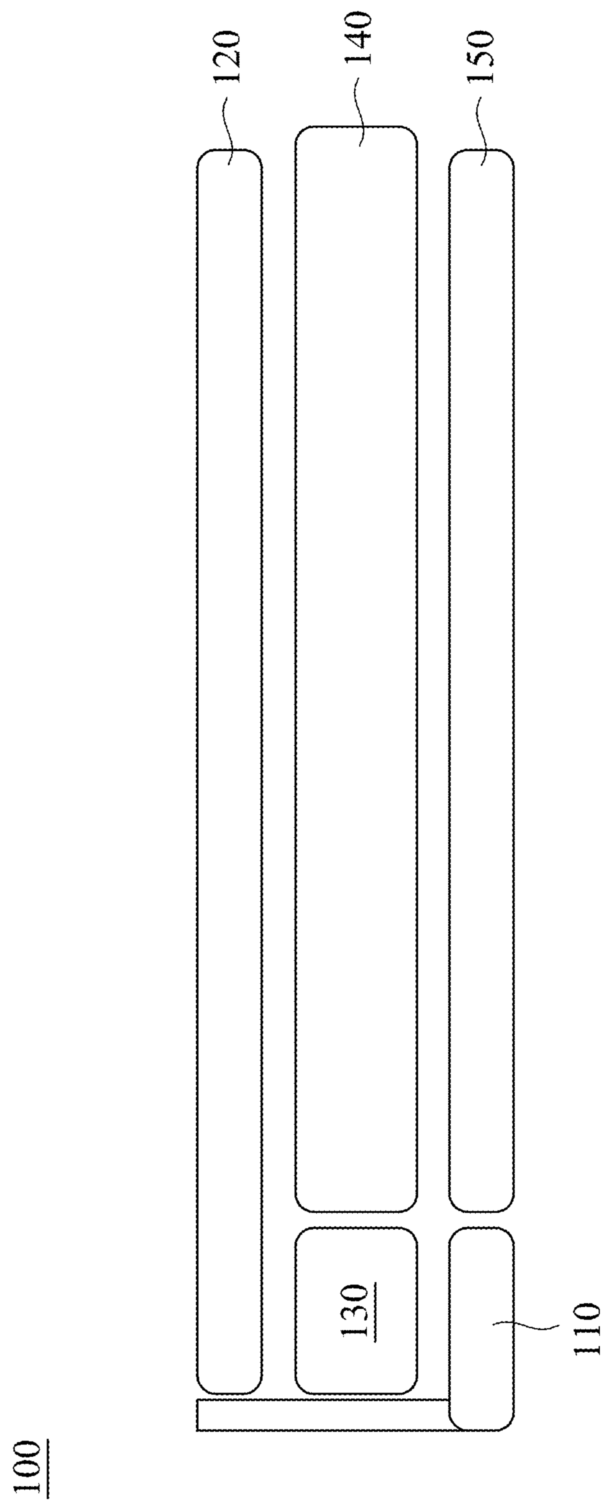
FIG. 1 is a schematic diagram showing a wireless communication device in accordance with embodiments of the present invention.

In accordance with customary practice, the various features and elements in the drawings are not drawn to scale, but are drawn in a manner that best represents the specific features and elements relevant to the present disclosure. Furthermore, among the different drawings, similar elements/components are referred to by the same or similar reference numerals.

DETAILED DESCRIPTION

Referring to FIG. 1, a wireless communication device 100 in accordance with embodiments of the present invention. The wireless communication device 100 includes a radio frequency circuit module 110, a storage device 120, a magnetic device 130, a battery 140 and a wireless charging device 150, in which the radio frequency circuit module 110, the storage device 120, the battery 140 and the wireless charging device 150 are electrically connected to each other to provide various operations. The magnetic device 130 is arranged to enable an iron structure or a magnetic structure (magnet) of a corresponding wireless communication device and the magnetic device 130 to be attracted by each other for positioning.

The radio frequency circuit module 110 is configured to provide a high speed data transmission function, and thus the wireless communication device 100 is capable of performing high speed data transmission through the radio frequency circuit module 110. In this embodiment, the wireless communication device 100 is a flash drive using the radio frequency circuit module 110 to perform high speed data transmission. For example, the flash drive can transmit data to an external device at a high speed through the radio frequency circuit module 110. For another example, the flash drive can receive data from an external device at a high speed through the radio frequency circuit module 110. In this embodiment, the radio frequency circuit module 110 can be bent into an L-shape and disposed at a corner of the wireless communication device 100. Therefore, the inner space of the wireless communication device 100 is better utilized.

A number of first data sets may be stored in the storage device 120, and transmitted to an external device by using the radio frequency circuit module 110. Further, a number of second data sets can be received from an external device by using the radio frequency circuit module 110, and then stored in the storage device 120.

The battery 140 is configured to provide electric power to circuits of the wireless communication device 100, for example the radio frequency circuit module 110 and the storage device. The wireless charging device 150 is configured to enable wireless charging to allow the battery 140 to receive electric power form an external device for battery charging. In other embodiments, the wireless charging device 150 is omitted in the wireless communication device 100, or the battery 140 is further omitted together with the wireless charging device 150. In this case, an external power may be used to directly provide electric power to the wireless communication device 100.

In some embodiments, the wireless communication device 100 includes a control circuit (not shown) to control the radio frequency circuit module 110 and the storage device 120 to perform the storing/transmitting of the above data sets.

Figure 2:
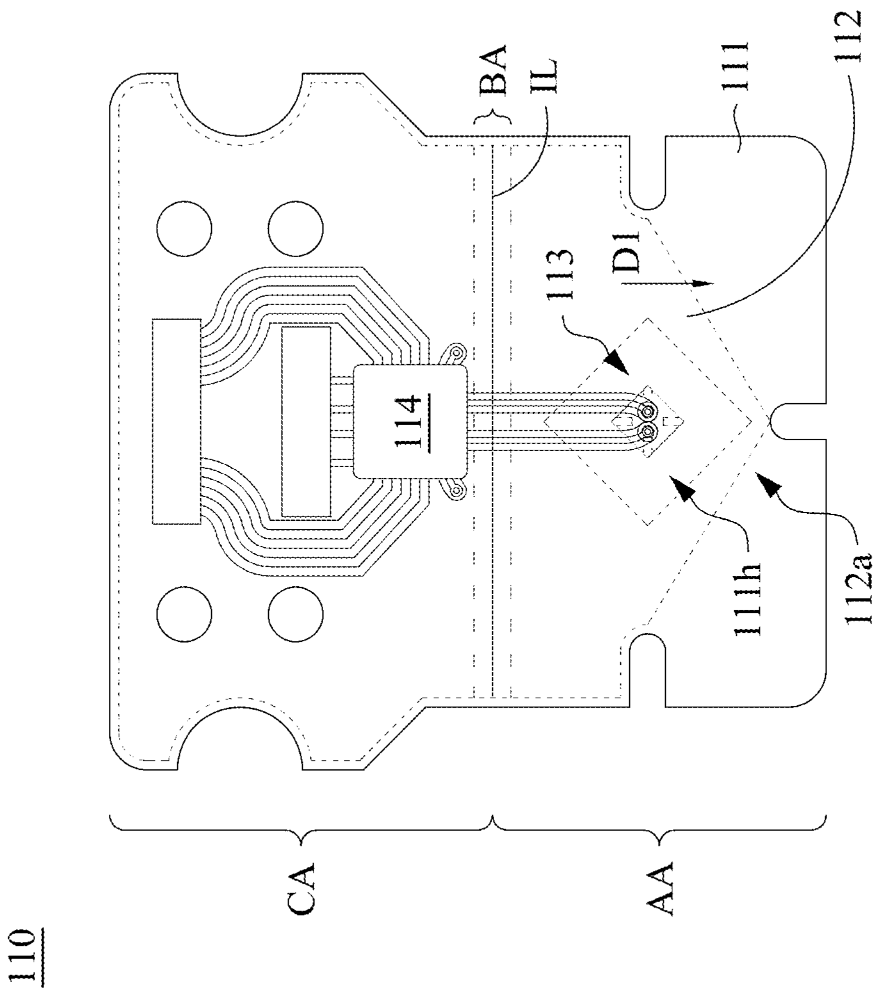
FIG. 2 is a schematic diagram showing a whole structure of the radio frequency circuit module in accordance with embodiments of the present invention.

Referring to FIG. 2 and FIG. 3A to FIG. 3E, as shown in FIG. 2, the radio frequency circuit module 110 includes a flexible substrate 111, a metal plate 112, an antenna structure 113 and a control chip 114. The antenna structure 113 is electrically connected to the control chip 114 to form an antenna module to transmit antenna signals. The flexible substrate 111 is used to carry the metal plate 112, the antenna structure 113 and the control chip 114, and can be bent in accordance with demands for mechanism design. In this embodiment, the radio frequency circuit module 110 includes a multi-layered structure. The multi-layered structure includes at least one flexible substrate 111 to carry the metal plate 112, the antenna structure 113 and the control chip 114. For example, the metal plate 112 may be disposed on a top layer of the multi-layered structure, the antenna structure 113 is disposed on a $1^{st}$ inner layer of the multi-layered structure, and the control chip 114 is disposed on a bottom layer of the multi-layered structure. Material of the flexible substrate 111 can be liquid crystal polymer (LCP), but embodiments of the present invention are not limited thereto. In some embodiments, the material of the flexible substrate 111 can be polyimide (PI) or modified PI.

Specifically, the antenna structure 113 is located at a substrate region AA, the control chip 114 is located at a substrate region CA, and the flexible substrate 111 can be bent (or folded) at a junction line IL between the substrate region AA and the substrate region CA, and thus the radio frequency circuit module 110 is foldable at a foldable portion BA. In other words, in the embodiments of the present invention, the portion adjacent to the substrate region AA and the substrate region CA is defined as the foldable portion BA. The radio frequency circuit module 110 can be bent at the foldable portion BA to meet the demands of mechanism design.

Figure 3B:
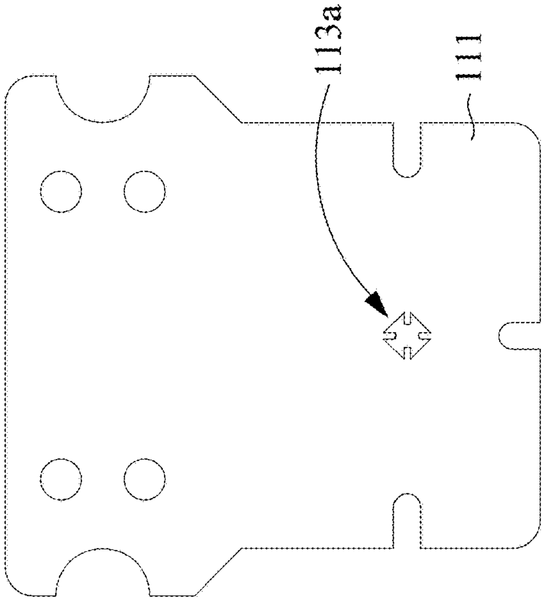
FIG. 3A to FIG. 3E are schematic diagrams showing respective layers of the radio frequency circuit module in accordance with an embodiment of the present invention.
Figure 3A:
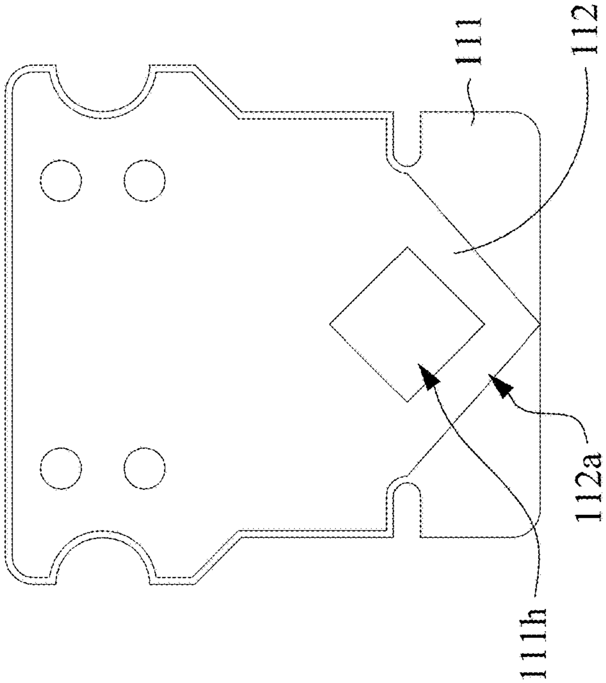

Referring to FIG. 2, FIG. 3A and FIG. 3B simultaneously, the structure of the top layer of the radio frequency circuit module 110 includes the metal plate 112 and the flexible substrate 111 carrying the metal plate 112. The top layer of the radio frequency circuit module 110 has an opening 111*h* to expose a first antenna radiation plate 113*a* underlying the top layer. An edge of the metal plate 112 has a corner portion 112*a*, and a vertex of the corner portion 112*a* extends away from the control chip 114 along a direction D1.

Figure 3C:
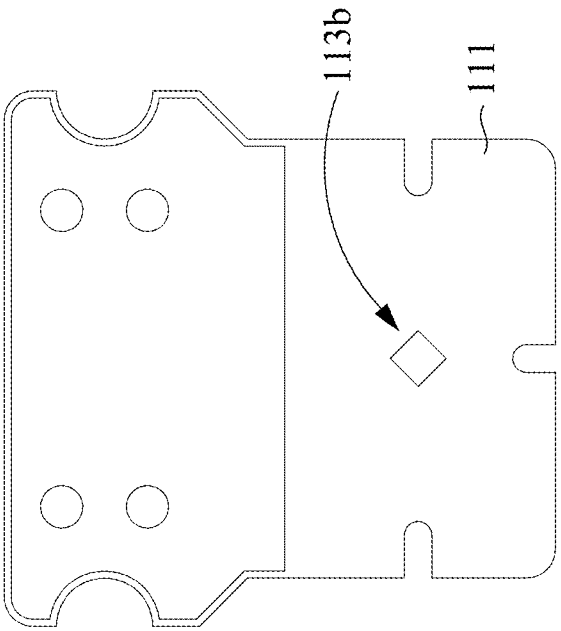

Referring to FIG. 2, FIG. 3B and FIG. 3C simultaneously, in this embodiment, the antenna structure 113 includes the first antenna radiation plate 113*a* and a second antenna radiation plate 113*b*. The first antenna radiation plate 113*a* is disposed in a structure of a $1^{st}$ inner layer, and the second antenna radiation plate 113*b* is disposed in a structure of a $2^{nd}$ inner layer, in which the first antenna radiation plate 113*a* is disposed on a front surface (towards the top layer) of a flexible substrate 111, and the second antenna radiation plate 113*b* is disposed on a back surface (towards a $3^{rd}$ inner layer) of the flexible substrate 111. Therefore, the first antenna radiation plate 113*a* and the second antenna radiation plate 113*b* are separated by a flexible material (the flexible substrate 111 between the first antenna radiation plate 113*a* and the second antenna radiation plate 113*b*), and coupling to each other through a distance between the first antenna radiation plate 113*a* and the second antenna radiation plate 113*b*, thereby forming the antenna structure 113. In the embodiments of the present invention, the second antenna radiation plate 113*b* is overlapped with the first antenna radiation plate 113*a* along a normal direction of the first antenna radiation plate 113*a*, and underlies the first antenna radiation plate 113*a*, and a liquid crystal polymer the same as the flexible substrate 111 is disposed there between to separate the first antenna radiation plate 113*a* and the second antenna radiation plate 113*b*.

Figure 3D:
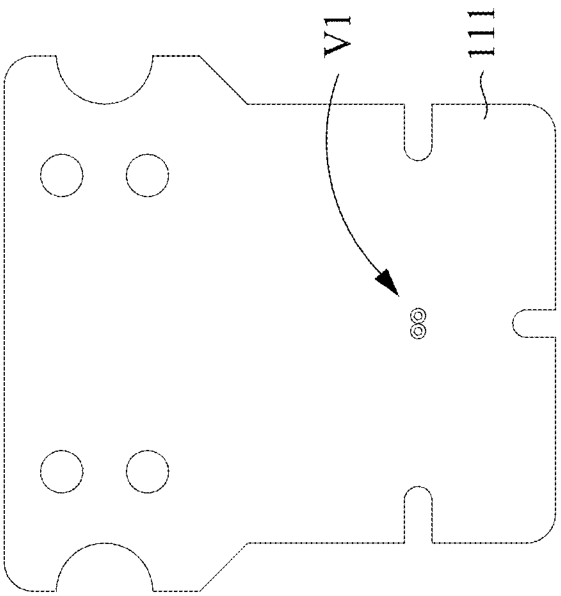
Figure 3E:
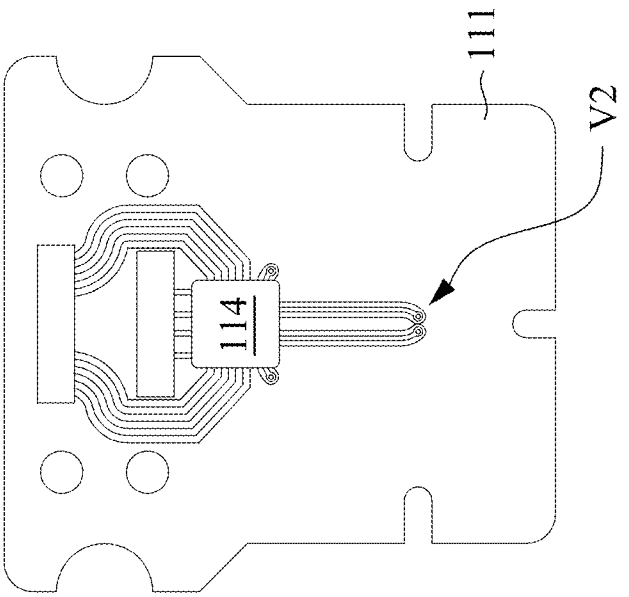

Referring to FIG. 2, FIG. 3D and FIG. 3E simultaneously, in this embodiment, electric elements are generally disposed on the bottom layer of the radio frequency circuit module 110. Specifically, a structure of the bottom layer of the radio frequency circuit module 110 includes plural electric elements and flexible substrate 111 carrying the electric elements. The electric element, for example the control chip 114 is electrically connected to the antenna structure 113 through traces on the flexible substrate 111. In this embodiment, FIG. 3D and FIG. 3E show the structures of the $3^{rd}$ inner layer and the bottom layer, in which the control chip 114 is electrically connected to second antenna radiation plate 113*b* through feeding vias V2 of the bottom layer and the vias V1 of the $3^{rd}$ inner layer.

Figure 4B:
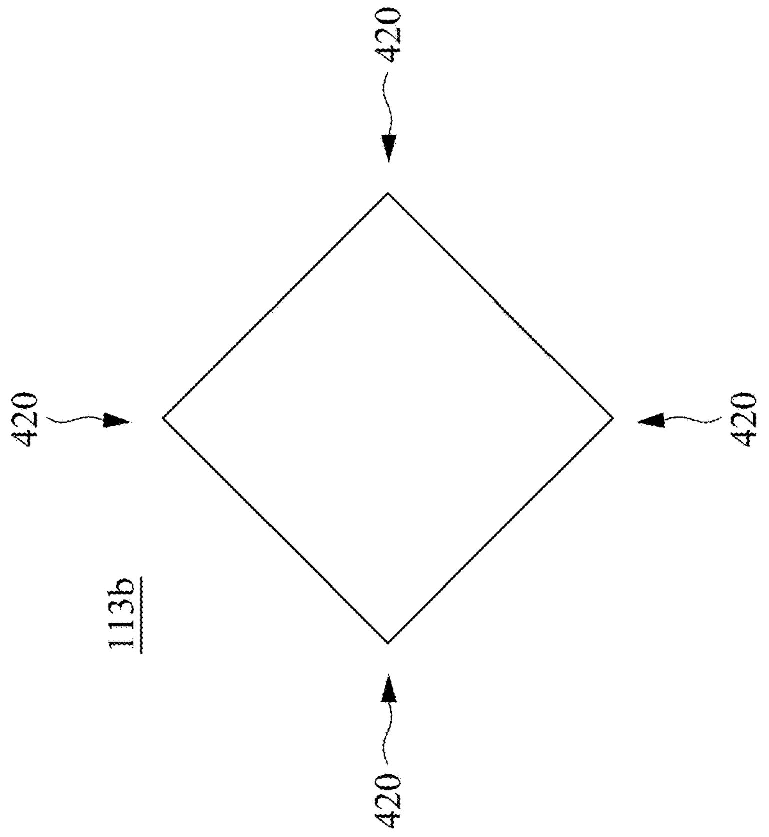
FIG. 4B is a schematic diagram showing an enlarged structure of the second antenna radiation plate in accordance with an embodiment of the present invention.
Figure 4A:
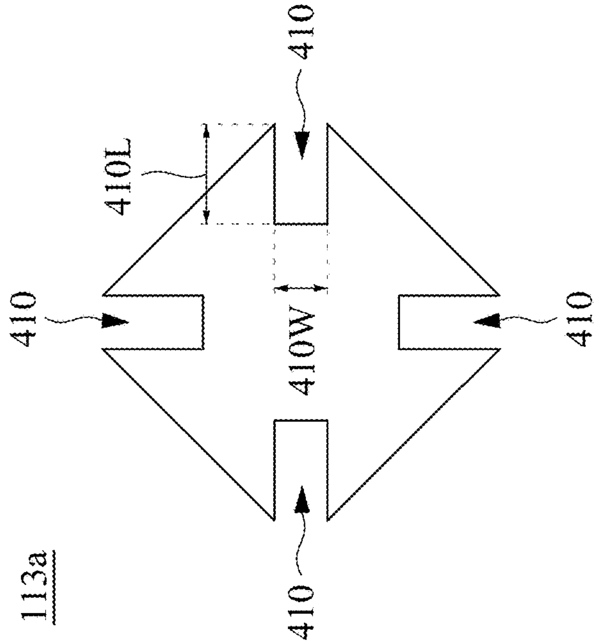
FIG. 4A is a schematic diagram showing an enlarged structure of the first antenna radiation plate in accordance with an embodiment of the present invention.
Figure 4C:
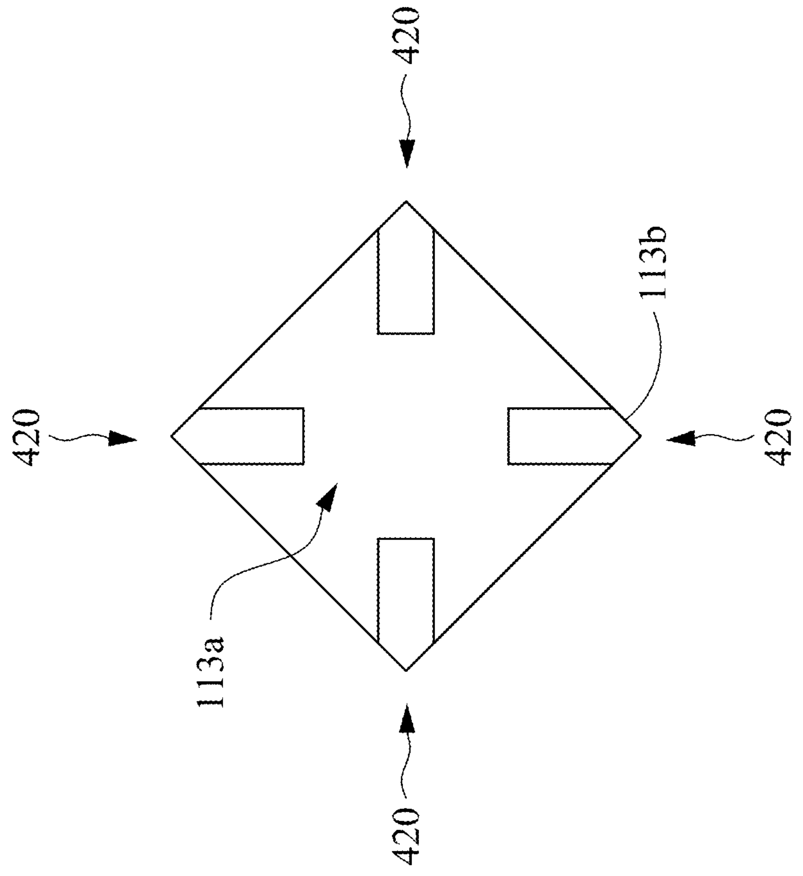
FIG. 4C is a schematic diagram showing the second antenna radiation plate 113*b* overlapped with the first antenna radiation plate in accordance with an embodiment of the present invention.

Referring to FIG. 4A and FIG. 4B simultaneously, FIG. 4A shows the first antenna radiation plate 113*a* has a plurality of open slots 410 extending from a plurality of edges of the first antenna radiation plate 113*a* to a center of the first antenna radiation plate 113*a*. The second antenna radiation plate 113*b* has a plurality of corner portions 420 corresponding to the open slots 410 of the first antenna radiation plate 113*a* in a one-to-one manner. In other words, when the first antenna radiation plate 113*a* is overlapped with the second antenna radiation plate 113*b* (as shown in FIG. 4C), the open slots 410 are overlapped with the corner portions 420, and the open slots 410 encompass the corner portions 420. In some embodiments, the first antenna radiation plate 113*a* is considered to be slotted at positions corresponding to the corner portions 420 of the second antenna radiation plate 113*b*. In some embodiments, the length 410L of each of the open slots 410 is ranging from $0.015\lambda$ to $0.1\lambda$, the width 410W of each of the open slots 410 is ranging from $0.015\lambda$ to $0.1\lambda$, where $\lambda$ is the wavelength of the wireless communication device. In some embodiments, the distance between the first antenna radiation plate 113*a* and the second antenna radiation plate 113*b* (can be considered to be a thickness of the flexible substrate 111) is ranging from $0.015\lambda$ to $0.1\lambda$. The above slot designs can be varied in accordance with user's demands, thereby changing the antenna bandwidth and the antenna matching as required.

The antenna structure 113 of the embodiments of the present invention may have two feeding points (TX and RX, or dual TX/dual RX), but embodiments of the present invention are not limited thereto. For example, the antenna structure 113 may have a first feeding portion and a second feeding portion such as the two vias V1, in which the first feeding portion is electrically connected to a transmission (TX) pin of the control chip 114, and the second feeding portion is electrically connected to a receiving (RX) pin of the control chip 114.

Figure 5:
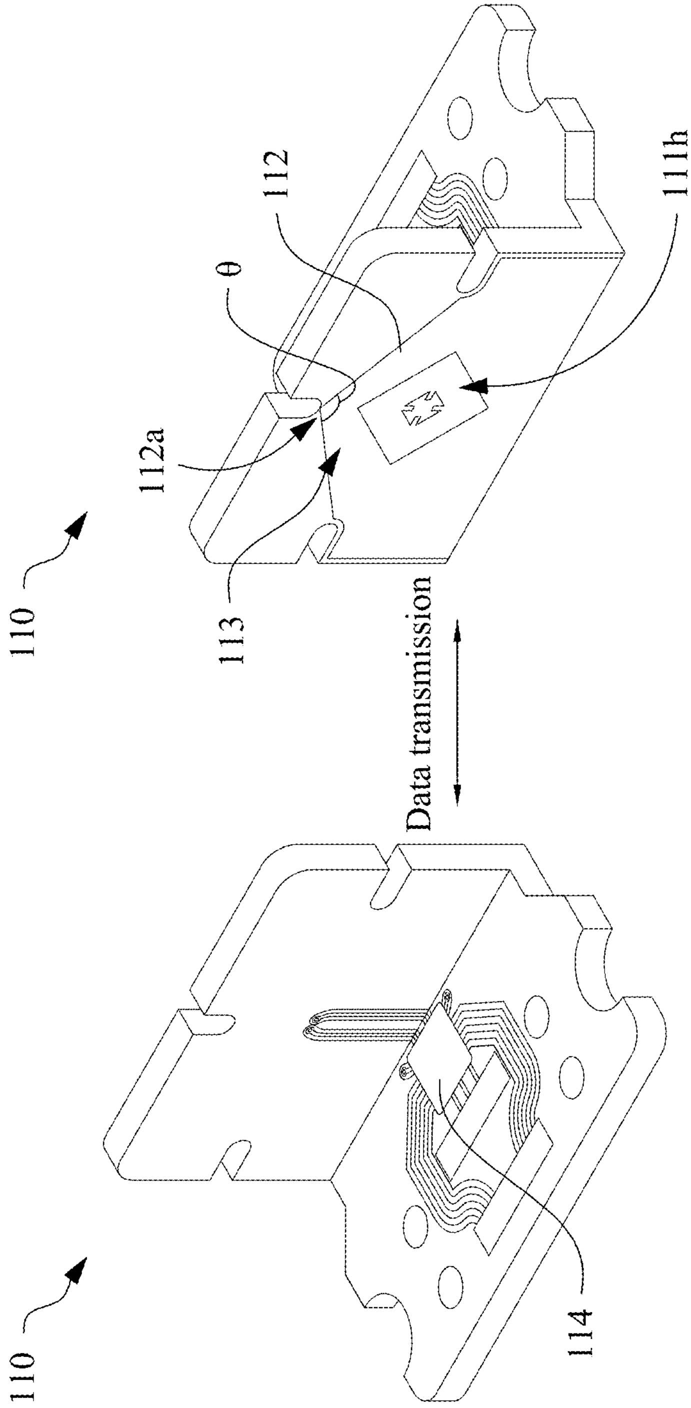
FIG. 5 is a schematic diagram showing data transmission between two radio frequency circuit modules in accordance with an embodiment of the present invention.

Referring to FIG. 5, when data transmission is performed between two radio frequency circuit modules 110, the antenna structures 113 of the two radio frequency circuit modules 110 are arranged to face each other. Therefore, the antenna structures are coupled to each other, and the data transmission is affected by the coupling effect. In the embodiments of the present invention, the metal plates 112 having the corner portions 112*a* are formed in the two radio frequency circuit modules 110, and each of the metal plates 112 is designed to enable the corner portion 112*a* to have a width getting smaller. Therefore, when the antenna structures 113 of the two radio frequency circuit modules 110 are arranged to face each other to perform the data transmission, the metal plates 112 having the corner portions 112*a* can be used to avoid the coupling effect of the antenna structures. In some embodiments, the angle included by two side of the corner portion 112*a* is in a range from 100 degrees to 150 degrees, and the corner portion 112*a* extends away from the control chip 114. However, embodiments of the present invention are not limited thereto.

Figure 6:
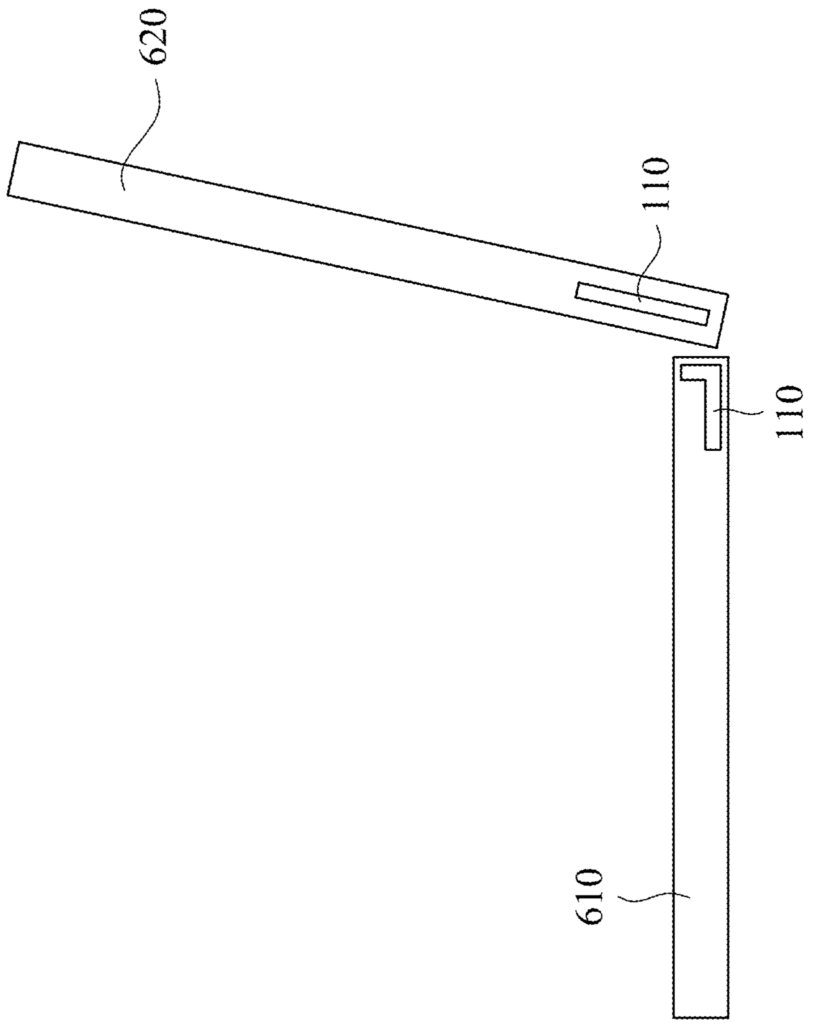
FIG. 6 is a schematic diagram showing wireless communication devices in accordance with an embodiment of the present invention.

Referring to FIG. 6, the wireless communication device 620 is a screen of a notebook, and the communication device 610 is a computer host of the notebook. The above radio frequency circuit modules 110 can be used to perform wireless data transmission between the screen and the computer host of the notebook without cables disposed for wired transmission.

In some embodiments, the above radio frequency circuit module 110 can be used in a remote controller to perform data transmission. The radio frequency circuit module 110 of the present invention can achieve data transmission for short distance, high speed and high accuracy, and interference between antennas can be avoided. Further, flexible substrates are used in the radio frequency circuit module 110, thereby enabling the radio frequency circuit module 110 to be adapted for structures of various mobile devices, and increasing a usage rate of the inner space of the mobile devices.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A wireless communication device, comprising:

a radio frequency circuit module, comprising:

an antenna module comprising an antenna structure and a control chip, wherein the control chip is electrically connected to the antenna structure and configured to use the antenna structure to perform wireless communication; and at least one flexible substrate configured to carry the antenna module, wherein the at least one flexible substrate comprises two substrate regions, one of the substrate regions encompasses the antenna structure or the control chip, a foldable portion of the at least one flexible substrate is foldable at a junction line between the substrate regions, and the radio frequency circuit module is foldable at the foldable portion;

wherein the antenna structure comprises:

a first antenna radiation plate having a plurality of open slots extending from a plurality of edges of the first antenna radiation plate to the center of the first antenna radiation plate; and a second antenna radiation plate disposed under the first antenna radiation plate and overlapped with the first antenna radiation plate along the normal direction of the first antenna radiation plate, wherein there is a distance located between the first antenna radiation plate and the second antenna radiation plate, and the distance enables the second antenna radiation plate to couple with the first antenna radiation plate;

wherein the antenna module further comprises a metal plate disposed on the antenna module and overlapped with the antenna structure, wherein the metal plate has a though hole to expose the antenna structure, an edge of the metal plate has a corner portion, and an angle included by two side of the corner portion is in a range from 100 degrees to 150 degrees.

2. The wireless communication device of claim 1, wherein the radio frequency circuit module is capable of being bent in an L-shape, and disposed at a corner of the wireless communication device.

3. The wireless communication device of claim 1, wherein the second antenna radiation plate of the antenna structure further comprises at least one first feeding portion and at least one second feeding portion, wherein the least one first feeding portion is electrically connected to a transmission (TX) pin of the control chip, and the at least one second feeding portion is electrically connected to a receiving (RX) pin of the control chip.

4. The wireless communication device of claim 3, wherein the length of each of the open slots is ranging from $0.015\lambda$ to $0.1\lambda$, the width of each of the open slots is ranging from $0.015\lambda$ to $0.1\lambda$, and $\lambda$ is the wavelength of the wireless communication device.

5. The wireless communication device of claim 3, wherein the distance between the first antenna radiation plate and the second antenna radiation plate is ranging from $0.015\lambda$ to $0.1\lambda$, and $\lambda$ is the wavelength of the wireless communication device.

6. The wireless communication device of claim 1, further comprising a storage device storing a plurality of first data sets and electrically connected to the radio frequency circuit module to use the radio frequency circuit module to transmit the first data sets, or to receive a plurality of second data sets and store the second data sets into the storage device.

7. The wireless communication device of claim 6, further comprising:

a battery configured to provide electric power to the radio frequency circuit module and the storage device; and a wireless charging device configured to charge the battery.

8. The wireless communication device of claim 1, wherein material of the at least one flexible substrate is liquid crystal polymer (LCP).

9. The wireless communication device of claim 1, further comprising a magnetic device, wherein an iron structure or a magnetic structure of a corresponding wireless communication device and the magnetic device are attracted by each other for positioning.

10. A wireless communication system, comprising a plurality of wireless communication devices, wherein each of the wireless communication devices comprises:

a radio frequency circuit module, comprising:

an antenna module comprising an antenna structure and a control chip, wherein the control chip is electrically connected to the antenna structure and configured to use the antenna structure to perform wireless communication; and at least one flexible substrate configured to carry the antenna module, wherein the at least one flexible substrate comprises two substrate regions, one of the substrate regions encompasses the antenna structure or the control chip, a foldable portion of the at least one flexible substrate is foldable at a junction line between the substrate regions, and the radio frequency circuit module is foldable at the foldable portion; wherein the antenna structure comprises:

a first antenna radiation plate having a plurality of open slots extending from a plurality edges of the first antenna radiation plate to a center of the first antenna radiation plate; and a second antenna radiation plate disposed under the first antenna radiation plate and overlapped with the first antenna radiation plate along a normal direction of the first antenna radiation plate, and there is a distance located between the first antenna radiation plate and the second antenna radiation plate, and the distance enables the second antenna radiation plate to couple with the first antenna radiation plate;

wherein when a first one of the wireless communication devices communicates with a second one of the wireless communication devices, the antenna module of the first one of the wireless communication devices and the antenna module of the second one of the wireless communication devices are arranged to face each other;

wherein the antenna module further comprises a metal plate disposed on the antenna module and overlapped with the antenna structure, wherein the metal plate has a though hole to expose the antenna structure, an edge of the metal plate has a corner portion, and an angle included by two side of the corner portion is in a range from 100 degrees to 150 degrees.

11. The wireless communication system of claim 10, wherein the radio frequency circuit module is capable of being bent in a L-shape, and disposed at a corner of the wireless communication device.

12. The wireless communication system of claim 10, wherein the second antenna radiation plate of the antenna structure further comprises at least one first feeding portion and at least one second feeding portion, wherein the least one first feeding portion is electrically connected to a transmission (TX) pin of the control chip, and the at least one second feeding portion is electrically connected to a receiving (RX) pin of the control chip.

13. The wireless communication system of claim 12, wherein the length of each of the open slots is ranging from $0.015\lambda$ to $0.1\lambda$, the width of each of the open slots is ranging from $0.015\lambda$ to $0.1\lambda$, and $\lambda$ is the wavelength of the wireless communication device.

14. The wireless communication system of claim 12, wherein the distance between the first antenna radiation plate and the second antenna radiation plate is ranging from $0.015\lambda$ to $0.1\lambda$, and $\lambda$ is the wavelength of the wireless communication device.

15. The wireless communication system of claim 10, wherein each of the wireless communication devices further comprises a storage device storing a plurality of first data sets and electrically connected to the radio frequency circuit module to use the radio frequency circuit module to transmit the first data sets, or to receive a plurality of second data sets and store the second data sets into the storage device.

16. The wireless communication system of claim 15, wherein each of the wireless communication devices further comprises:

a battery configured to provide electric power to the radio frequency circuit module and the storage device; and a wireless charging device configured to charge the battery.

17. The wireless communication system of claim 10, wherein material of the at least one flexible substrate is liquid crystal polymer (LCP).

18. The wireless communication system of claim 10, further comprising a magnetic device, wherein an iron structure or a magnetic structure of a corresponding wireless communication device and the magnetic device are attracted by each other for positioning.

* * * * *